United States Patent [19]

Suh et al.

[11] 4,438,224

[45] Mar. 20, 1984

[54] METHOD FOR THE PREPARATION OF STYRENE POLYMER FOAM AND FOAM PREPARED THEREBY

[75] Inventors: Kyung W. Suh, Granville; David C. Krueger, Reynoldsburg; Burch E. Zehner, Pataskala, all of Ohio

[73] Assignee: The Dow Chemical Co., Midland, Mich.

[21] Appl. No.: 523,216

[22] Filed: Aug. 15, 1983

Related U.S. Application Data

[62] Division of Ser. No. 426,414, Sep. 29, 1982.

[51] Int. Cl.³ .................................................. C08J 9/14
[52] U.S. Cl. ...................................... 521/146; 264/53; 264/DIG. 5; 521/79; 521/88; 521/98; 521/147; 521/910
[58] Field of Search ............... 521/146, 147, 79, 88, 521/98, 910; 264/53, DIG. 5

[56] References Cited

U.S. PATENT DOCUMENTS

| | | | |
|---|---|---|---|
| 3,960,792 | 6/1976 | Nakamura et al. | 521/79 |
| 4,085,073 | 4/1978 | Suh et al. | 521/246 |
| 4,312,910 | 1/1982 | Suh et al. | 521/79 |
| 4,386,165 | 5/1983 | Suh et al. | 521/146 |

*Primary Examiner*—Morton Foelak
*Attorney, Agent, or Firm*—R. B. Ingraham

[57] ABSTRACT

Mechanically stable styrene polymer foams having highly desirable physical properties are prepared employing as a blowing agent a mixture of lower alcohols with chlorofluoromethanes.

1 Claim, No Drawings

METHOD FOR THE PREPARATION OF STYRENE POLYMER FOAM AND FOAM PREPARED THEREBY

CROSS-REFERENCE TO RELATED APPLICATION

This is a divisional of application Ser. No. 426,414, filed Sept. 29, 1982.

One of the larger applications for styrene polymer foams is in the field of thermal insulation. The styrene polymer foam suitable for thermal insulation desirably has relatively small cells and dimensional stability. It is also desirable that the insulating value of the foam be maintained for as long a period as possible. The variety of styrene polymer foams contemplated within the scope of this invention are the so-called extruded foams. Such extruded foams have a fairly uniform cell size when compared to the so-called molded bead foams. Extruded foams are also employed in the so-called decorative field wherein a foam plank may be cut into a decorative foam and be used as is or used as a base for further decorative material. Particularly desirable stable styrene polymer foam is obtained employing the method set forth in U.S. Pat. No. 3,960,792 to M. Nakamura. For a considerable period of time, styrene polymer foams have been extruded employing methyl chloride alone as the blowing agent or a mixture of methyl chloride with chlorofluorocarbons. When employing such a system in extrusion, generally the foam must be aged for a period of time to permit the methyl chloride to leave the cells and air to enter by an appropriate diffusion process through the cell walls. Also, in foams employing methyl chloride as the total blowing agent or as a partial blowing agent, the period of aging for thicker extruded boards and planks can present an inconvenient warehousing problem. Also, due to the undesirable physical characteristics of methyl chloride, caution and good ventilation are utilized when such foams are cut to shape.

Extruded foams and their manufacture are discussed in great length in U.S. Pat. Nos. 2,409,910; 2,515,250; 2,669,751; 2,848,428; 2,928,130; 3,121,130; 3,121,911, 3,770,688; 3,815,674; 3,960,792; 3,966,381; 4,085,073 and 4,146,563, the teachings of which are herein incorporated with reference thereto.

It would be desirable if there are available an improved process for the preparation of alkenyl aromatic polymer foam.

It would also be desirable if there were available an improved process for the preparation of an alkenyl aromatic polymer foam which did not employ methyl chloride as the blowing agent.

It would also be desirable to replace methyl chloride with a relatively non-toxic readily available material.

These benefits and other advantages in accordance with the present invention are achieved in a process for the preparation of an alkenyl aromatic thermoplastic resinous elongate foam body having a machine direction and a transverse direction, the body defining a plurality of closed noninterconnecting gas-containing cells therein, the steps of the method comprising heat plastifying an alkenyl aromatic synthetic resinous material, adding to the heat plastifying synthetic resinous material a volatile fluid foaming agent to provide a foaming agent resinous polymer mixture under a pressure sufficiently high that foaming is prevented, mixing the fluid foaming agent with the plastified resin to form a blowable resinous mixture, reducing the temperature of the mixture to a temperature such that when pressure is removed therefrom, a foam of desirable quality is obtained, reducing the pressure on the mixture to thereby cause the mixture to form a foam of desired quality, the improvement which comprises employing a blowing agent selected from the group consisting of (1) a blowing agent mixture of from about 5 to 20 weight percent isopropyl alcohol, from about 5 to 50 percent chlorodifluoromethane, and from about 30 to 70 percent dichlorodifluoromethane;

(2) a mixture of from about 5 to 50 percent of an ethanol, methanol or mixtures thereof, from about 5 to 50 percent of chlorodifluoromethane, and about 30 to 70 percent dichlorodifluoromethane;

and mixtures thereof, all percentages being by weight.

Also contemplated within the scope of the present invention is a synthetic resinuous thermoplastic foam prepared in accordance with the hereinbefore described method wherein an alkenyl aromatic thermoplastic synthetic resinous elongate foam body having a machine direction and a transverse direction, the body defining a plurality of closed noninterconnecting gas-containing cells therein, the cells having an average cell size of from about 0.1 to 1.2 millimeters and preferably from about 0.1 to 0.9 millimeters, the foam body being of a generally uniform cellular structure and being without discontinuities, the body being without substantial variation in average cell size when cell size is measured by averaging cell diameter across the minimum cross-sectional dimension of the body (i.e., such as by ASTM Method D2842-69), the elongate body having a cross-sectional area of at least 8 square inches and having a minimum cross-sectional dimension of at least 0.25 inch, the foam body having a water vapor permeability not greater than 1.8 perm inches as measured by ASTM Method C355-64 Procedures for Desiccant method, a density of from about 1 to about 5 pounds per cubic foot with the further limitation that the cells contain a blowing agent which has a permeability through the alkenyl aromatic resinous polymer of not greater than 0.017 times the permeability of nitrogen through the body a $C_1$ to $C_3$ monohydric alcohol and the blowing agent having a thermal conductivity not greater than 0.08 British thermal units-inch per hour per square foot per degree Fahrenheit.

By the term "alkenyl aromatic synthetic resin" is meant a solid polymer of one or more polymerizable alkenyl aromatic compounds. The polymer or copolymer comprises in chemically combined form, at least 70 percent by weight of at least one alkenyl aromatic compound having the general formula

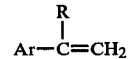

wherein Ar represents an aromatic hydrocarbon radical, or an aromatic halo-hydrocarbon radical of the benzene series, and R is hydrogen or a methyl radical. Examples of such alkenyl aromatic resins are the solid homopolymer of styrene, a-methylstyrene, o-methylstyrene, m-methylstyrene, p-methylstyrene, ar-ethylstyrene, ar-vinylxylene, ar-chlorostyrene or ar-bromostyrene; the solid copolymers of two or more of such alkenyl aromatic compounds with minor amounts of other readily polymerizable olefinic compounds such as methylmethacrylate, acrylonitrile, maleic anhydride, citraconic anhydride, itaconic anhydride, acrylic acid, rubber reinforced (either natural or synthetic) styrene polymers, etc.

Blowing agents useful in the practice of the present invention may be of commercial purity and generally are satisfactory. However, denatured ethyl alcohol is available in a wide variety of formulations wherein denaturing is accomplished by adding materials ranging from methanol to low volatility materials such as hard soap, sulfuric acid and the like. In order to be suitable for the practice of the present invention, such denatured alcohol should in general be noncorrosive to the processing equipment or to the environment in which the foam so prepared is to be used. Furthermore, in order to provide a desirable foam, a denatured ethanol should not unduly depress the heat distortion temperature. In order to determine whether a particular denatured alcohol is suitable for the practice of the present invention, one percent by weight of the alcohol based on the weight of the polymer is incorporated in the desired polymer, the resultant mixture injection molded. The injection molded test piece is maintained under pressure until it has solidified to thereby prevent foaming of the test piece. The Vicat heat distortion temperature of the molded specimen is then determined in accordance with the American Society for Testing Materials Test D-1525-76. A similar injection molding is made employing polymer without the denatured alcohol and the Vicat heat distortion determined in a similar manner. If the heat distortion temperature of the sample containing 1 percent of the denatured alcohol is not more than 7 degrees centigrade below the heat distortion temperature of the sample without alcohol, the alcohol is satisfactory for the practice of the present invention. However, if the heat distortion temperature of the sample containing the alcohol being evaluated is more than about 7 degrees centigrade below that of the sample molded without the denatured alcohol, the alcohol is unsatisfactory for the practice of the present invention. Typical suitable denatured alcohols are those wherein all percentages are percentages by weight:

(1)

85.8% ethyl alcohol
4.3% wood alcohol
4.5% methanol
4.5% isopropyl alcohol
0.9% methylisobutyl ketone;

(2)

89.9% ethyl alcohol
4.5% methanol
4.7% ethyl acetate
0.9% methylisobutyl ketone;

(3)

82.1% ethyl alcohol
17% methanol
0.9% methylisobutyl ketone;

(4)

95.2% ethyl alcohol
1% kerosene
3.8% methylisobutyl ketone.

A wide variety of generally similar denatured ethyl alcohol formulations may be employed in the practice of the present invention which do not cause undue depression of the Vicat heat distortion temperature of the polymer. Up to 25 percent of a denaturing material may be employed provided that the ethyl alcohol formulation complies with the heat distortion requirements.

Generally, the preparation of alkenyl aromatic resinous polymer foams in accordance with the present invention is most conveniently done in a manner generally as shown and described in U.S. Pat. No. 2,669,751, wherein the volatile fluid foaming agent is injected into a heat-plastified polymer stream within an extruder. From the extruder the heat-plastified gel is passed into a mixer, the mixer being a rotary mixer wherein a studded rotor is enclosed within a housing which has a studded internal surface which intermeshes with the studs on the rotor. The heat-plastified gel from the extruder is fed into the inlet end of the mixer and discharged from the outlet end, the flow being in a generally axial direction. From the mixer, the gel passes through coolers such as are described in U.S. Pat. No. 2,669,751 and from the coolers to a die which extrudes a generally rectangular board. A generally similar extrusion system and a preferred extrusion system is shown in U.S. Pat. No. 3,966,381.

In the preparation of foams in accordance with the present invention, it is often desirable to add a nucleating agent to reduce the cell size. Talc, calcium silicate, indigo, and the like are suitable agents which reduce cell size.

Various other additives may be utilized such as fire retardant chemical, stabilizers and the like. A plurality of foams were prepared employing a 2½ inch extruder wherein the foaming agent was admixed with molten resin, the resin passed to a static cooler, cooled to foaming temperature and discharged through a slot die having a width of about 3 inches. The resultant foam plank had a cross section dimension of about 1 inch by 8 inches. In cases where fire retarding agents, stabilizers and/or nucleating agents were added, these were dry blended with the resin pellets prior to entering into the extruder. The results are set forth in the following Table wherein the following abbreviations are employed:

| | |
|---|---|
| Wt % | Weight Percent |
| PPH | Parts per hundred parts of resin |
| FR agent | Fire retardant agent |
| MGO | Magnesium oxide |
| DAP | Diammonium hydrogen phosphate |
| BaSt | Barium stearate |
| TF | Foaming temperature, i.e., temperature of resin adjacent die slot prior to depressure in degrees centigrade. |
| DIE PRESS. (psi) | Die pressure in pounds per square inch. |
| pcf | Pounds per cubic foot |
| mm | Millimeters |
| V | The vertical direction or thickness |
| E | The extrusion direction |
| H | The horizontal or width |
| MeCl | Methyl chloride |
| F-12 | Dichlorodifluoromethane |
| IPA | Isopropyl alcohol |
| ETH | Ethyl alcohol |
| F-22 | Chlorodifluoromethane |
| MeOH | Methyl alcohol |
| Board formability | Board when emerging from the forming plate assembly; excellent, meaning relatively smooth skins without roughness; good, meaning |

-continued some roughness, tolerable for most applications; fair, too rough for many applications.

TABLE
Effect of Blowing Agent Compositions on Dimensional Stability and Board Formability

| Sample ID | Blowing Agent Type (wt %) | PPH | F.R. Agent Type | PPH | Stabilizer (PPH) MgO | DAP | BaSt (PPH) | Indigo (PPH) | Talc (PPH) | TF (°C.) |
|---|---|---|---|---|---|---|---|---|---|---|
| 1 | 50 MeCl/50 F-12 (Control) | 12.0 | HBCD | 1.85 | 0.03 | — | 0.075 | 0.035 | — | 123 |
| 2 | 20 IPA/80 F-12 | 12.0 | HBCD | 1.85 | 0.03 | — | 0.07 | 0.015 | — | 128 |
| 3 | 20 EtOH/80 F-12 | 10.6 | — | — | — | — | 0.07 | — | 0.2 | 130 |
| 4 | 20 EtOH/80 F-12 | 12.0 | HBCD | 1.80 | 0.03 | — | 0.07 | — | 0.4 | 127 |
| 5 | 20 EtOH/80 F-12 | 14.3 | — | — | — | — | 0.07 | — | 0.2 | 130 |
| 6 | 30 EtOH/70 F-12 | 13.0 | — | — | — | — | 0.07 | — | 0.4 | 131 |
| 7 | 40 EtOH/60 F-12 | 8.8 | — | — | — | — | 0.07 | — | 0.4 | 132 |
| 8 | 50 EtOH/50 F-12 | 10.2 | — | — | 0.38 | — | 0.07 | — | 0.2 | 128 |
| 9 | 13 EtOH/35 F-22/-52 F-12 | 11.5 | — | — | — | — | 0.075 | — | — | 130 |
| 10 | 16 EtOH/35 F-22/-49 F-12 | 14.3 | — | — | — | — | 0.075 | — | — | 125 |
| 11 | 23 EtOH/23 F-22/-54 F-12 | 12.0 | — | — | — | — | 0.075 | — | — | 128 |
| 12 | 26 EtOH/30 F-22/-44 F-12 | 13.5 | — | — | — | — | 0.075 | — | — | 117 |
| 13 | 50 F-22/50 F-12 | 12.0 | — | — | — | — | 0.075 | — | — | 131 |
| 14 | 23 EtOH/23 F-22/-54 F-12 | 13.4 | FR-651P | 1.8 | — | 0.5 | 0.07 | — | — | 119 |
| 15 | 23 EtOH/23 F-22/-54 F-12 | 13.3 | FR-651P | 1.8 | — | 0.5 | 0.07 | 0.01 | — | 116 |
| 16 | 23 EtOH/23 F-22/-54 F-12 | 13.0 | FR-651P | 1.8 | — | 0.8 | 0.075 | 0.1* | — | 118 |
| 17 | 23 MeOH/23 F-22/-54 F-12 | 12.5 | HBCD | 1.8 | — | 0.25 | 0.15 | 0.1* | 0.075 | 118 |
| 18 | 8 EtOH/23 MeOH/-54 F-12/15 F-22 | 13.3 | HBCD | 1.8 | — | 0.2 | 0.15 | 0.1* | 0.1 | 118 |
| 19 | 23 EtOH/23 F-22/-54 F-12 | 14.0 | HBCD | 1.8 | — | 0.2 | 0.15 | 0.1* | 0.03 | 123 |

| Sample ID | DIE PRESS. (psi) | Density (pcf) | Cell Size (mm) | Compressive Strength at 1 day (psi) V | E | H | Dimensional Stability at 1 day** HHI-524C at 158° F., 95% RH, 7 days exposure (%) V | E | H | Board Formability |
|---|---|---|---|---|---|---|---|---|---|---|
| 1 | 760 | 2.02 | 0.37 | 44.2 | 20.2 | 17.2 | −1.1 | −0.2 | −0.3 | Excellent |
| 2 | 740 | 2.98 | 0.45 | 22.8 | 32.0 | 27.4 | +1.6 +5.7 | −0.5 +0.2 | +0.2*** +1.4 | Fair |
| 3 | 660 | 2.44 | 0.51 | 15.7 | 29.0 | 21.3 | +1.49 | −0.58 | −0.06 | Good |
| 4 | 630 | 2.23 | 0.44 | 18.1 | 34.2 | 20.6 | +1.67 | −0.86 | −0.24 | Good |
| 5 | 685 | 1.78 | 0.54 | 14.9 | 11.8 | 8.4 | +1.52 | −0.01 | +0.67 | Good |
| 6 | 790 | 2.05 | 0.51 | 17.1 | 21.0 | 15.7 | +1.39 | −0.35 | −0.14 | Good |
| 7 | 780 | 2.61 | 0.53 | 20.1 | 29.9 | 22.5 | −0.13 | −0.62 | −0.28 | Good |
| 8 | 630 | 2.32 | 0.55 | 11.4 | 20.8 | 16.9 | +0.7 +2.64 | +1.6 −0.86 | +0.6*** −0.39 | Good |
| 9 | 815 | 2.17 | 1.01 | 19.6 | 27.6 | 23.4 | +1.2 | 0 | +0.5 | Excellent |
| 10 | 725 | 1.93 | 1.26 | 18.5 | 17.5 | 16.6 | +1.4 | −0.1 | +0.6 | Excellent |
| 11 | 650 | 1.88 | 0.78 | 13.9 | 18.1 | 9.5 | +1.7 | −0.3 | +1.0 | Excellent |
| 12 | 750 | 2.15 | 1.16 | 23.2 | 18.3 | 22.1 | +0.5 | +1.0 | +0.6 | Excellent |
| 13 | 840 | 2.19 | 0.41 | 28.7 | 27.5 | 27.7 | +0.7 | +0.5 | +0.6 | Excellent |
| 14 | 800 | 2.05 | 0.25 | 31.3 | 20.1 | 19.1 | +0.4 | +0.3 | +0.7 | Excellent |
| 15 | 700 | 2.13 | 0.19 | 48.4 | 17.5 | 18.4 | 0 | +1.2 | +1.1 | Excellent |
| 16 | 560 | 2.02 | 0.28 | 37.0 | 11.3 | 15.7 | +1.5 | +2.0 | +0.1 | Excellent |
| 17 | 630 | 2.11 | 0.68 | 28.4 | 21.0 | 22.3 | +0.3 | +0.2 | −0.2 | Excellent |
| 18 | 575 | 2.27 | 0.65 | 29.9 | 26.0 | 23.2 | +0.1 | −0.2 | −1.1 | Excellent |
| 19 | 675 | 1.77 | 0.48 | 30.5 | 9.6 | 11.8 | +1.7 | +1.7 | +0.5 | Excellent |

Note: Samples 3–16 were produced with Ethanol denatured with 9% isopropanol, 4.3% MeOH, 0.9% MIBK and samples 18 and 19 were produced with ethanol denatured with 11.7% methanol and 0.8% MIBK.
*Phthalocyanine blue pigment instead of indigo.
DAP = diammonium hydrogen phosphate.
**This federal specification for insulation products requires dimensional changes not more than ±2.0% in any direction at 158° F./95% relative humidity for 7 days exposure.
***22 hours at 167° F. one day after production.

| Sample ID | Blowing Agent Type (wt %) | PPH | F.R. Agent Type | PPH | Stabilizer (PPH) MgO | DAP | BaST (PPH) | Indigo (PPH) | Roman Blue* (PPH) | TF (°C.) |
|---|---|---|---|---|---|---|---|---|---|---|
| 20 | 23 EtOH/23 F-22/-54 F-12 | 12.0 | FR-651P | 1.0 | 0.03 | — | 0.07 | 0.01 | — | 125 |
| 21 | 23 EtOH/23 F-22/-54 F-12 | 12.0 | FR-651P | 1.0 | — | 0.25 | 0.07 | — | 0.01 | 123 |

TABLE-continued
Effect of Blowing Agent Compositions on Dimensional Stability and Board Formability

| | | | | | | | | | | |
|---|---|---|---|---|---|---|---|---|---|---|
| 22 | 23 EtOH/23 F-22/-54 F-12 | 12.0 | HBCD | 1.0 | — | 0.25 | 0.07 | 0.01 | — | 128 |
| 23 | 23 EtOH/23 F-22/-54 F-12 | 12.0 | HBCD | 1.0 | 0.05 | — | 0.07 | 0.01 | — | 128 |
| 24 | 23 EtOH/23 F-22/-54 F-12 | 12.0 | HBCD | 1.0 | — | 0.25 | 0.07 | — | 0.01 | 125 |

| Sample ID | Density (pcf) | Cell Size (mm) | Dimensional Stability at 1 day (%)** 167° F./ 22 hour exposure | | | Board Formability |
|---|---|---|---|---|---|---|
| | | | V | E | H | |
| 20 | 2.06 | 0.30 | +0.09 | −0.91 | −0.17 | Excellent |
| 21 | 1.97 | 0.32 | −0.74 | −0.53 | −0.88 | Excellent |
| 22 | 1.92 | 0.75 | +1.54 | −0.64 | −0.97 | Excellent |
| 23 | 1.92 | 0.58 | +0.46 | −0.74 | −0.60 | Excellent |
| 24 | 2.0 | 0.61 | +0.75 | −0.52 | −0.96 | Excellent |

Note:
*Roma Blue = phthalocyanine blue pigment.
Die pressure = 600–700 psi.
Samples 20–24 were produced with ethanol denatured with 11.7% methanol and 0.8% MIBK.
**Criteria for dimensional stability requires dimensional change less than 2% in any direction.

Foams in accordance with the present invention shown excellent retention of thermal insulating properties, with time, due to the presence of the chlorofluoromethane as well as providing desirable dimensional stability. The dimensional stability was determined by heating foam for 22 hours at 75 degrees centigrade.

In a manner similar to the foregoing a wide variety of lower alcohol containing fluorocarbon mixtures are readily employed to form desirable alkenyl aromatic resinous foams.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A synthetic resinous thermoplastic foam prepared in accordance with the hereinbefore described method wherein an alkenyl aromatic thermoplastic synthetic resinous elongate foam body having a machine direction and a transverse direction, the body defining a plurality of closed noninterconnecting gas-containing cells therein, the cells having an average cell size of from about 0.1 to 1.2 millimeters, the foam body being of a generally uniform cellular structure and being without discontinuities, the body being without substantial variation in average cell size when cell size is measured by averaging cell diameter across the minimum cross-sectional dimension of the body (i.e., such as by ASTM Method D2842-69), the elongate body having a cross-sectional area of at least 8 square inches and having a minimum cross-sectional dimension of at least 0.25 inch, the foam body having a water vapor permeability not greater than 1.8 perm inches as measured by ASTM Method C355-64 Procedures for Desiccant method, a density of from about 1 to about 5 pounds per cubic foot with the further limitation that the cells contain a blowing agent which has a permeability through the alkenyl aromatic resinous polymer of not greater than 0.017 times the permeability of nitrogen through the body, a $C_1$ to $C_3$ monohydric alcohol and the blowing agent having a thermal conductivity of 0.08 British thermal units-inch per hour per square foot per degree Fahrenheit, wherein the foam is prepared by extrusion employing a blowing agent selected from the group consisting of (1) a mixture of from about 5 to 20 weight percent isopropyl alcohol, from about 5 to 50 percent chlorodifluoromethane, and from about 30 to 70 percent dichlorodifluoromethane;

(2) a mixture of from about 5 to 50 percent of an ethanol, methanol or mixtures thereof, from about 5 to 50 percent of chlorodifluoromethane, and about 30 to 70 percent dichlorodifluoromethane;

and mixtures thereof, all percentages being by weight.

* * * * *